Feb. 15, 1955    E. A. RUTT, SR    2,701,981
STEREOSCOPIC PROJECTION DEVICE FOR
PROJECTING DUAL IMAGE SLIDES
Filed May 25, 1950    2 Sheets-Sheet 1
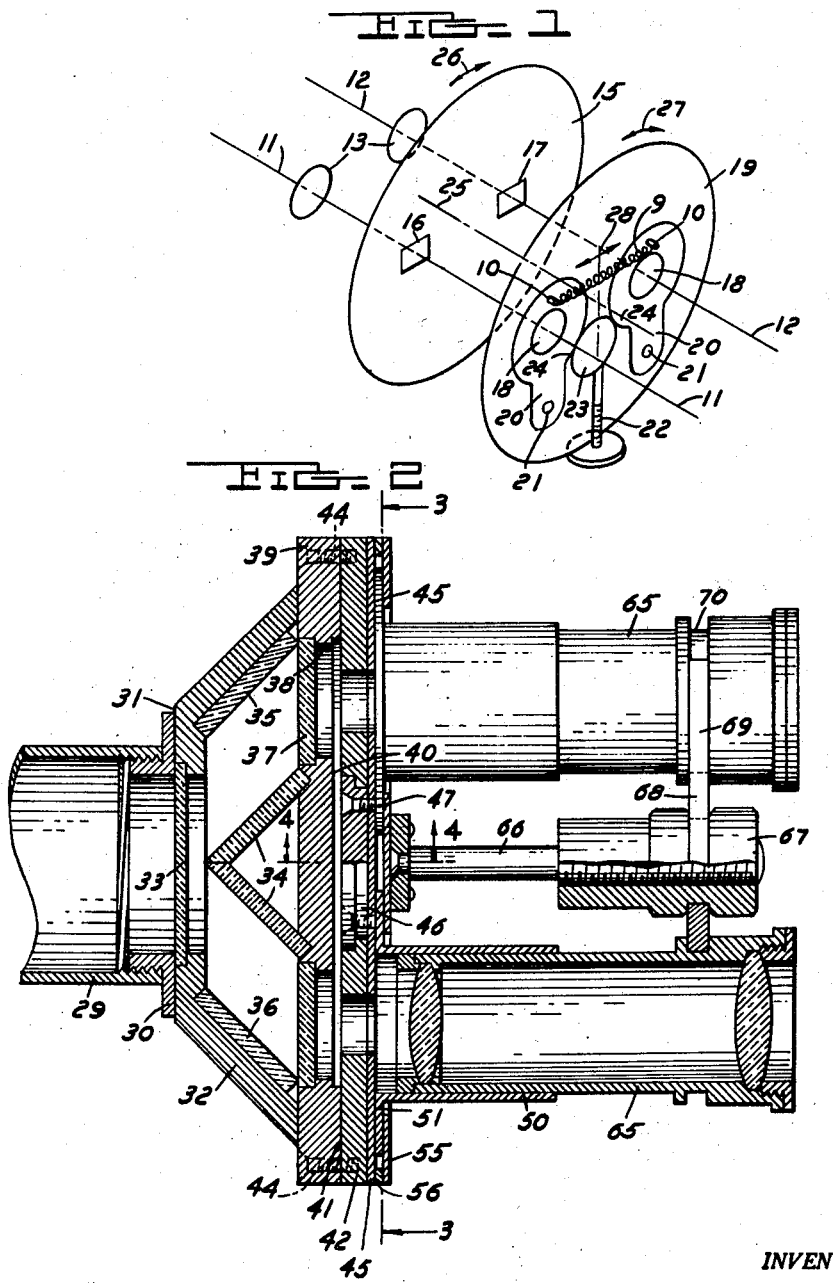
INVENTOR.
EDWARD A. RUTT SR.
BY
Farley, Forster & Farley
ATTORNEYS

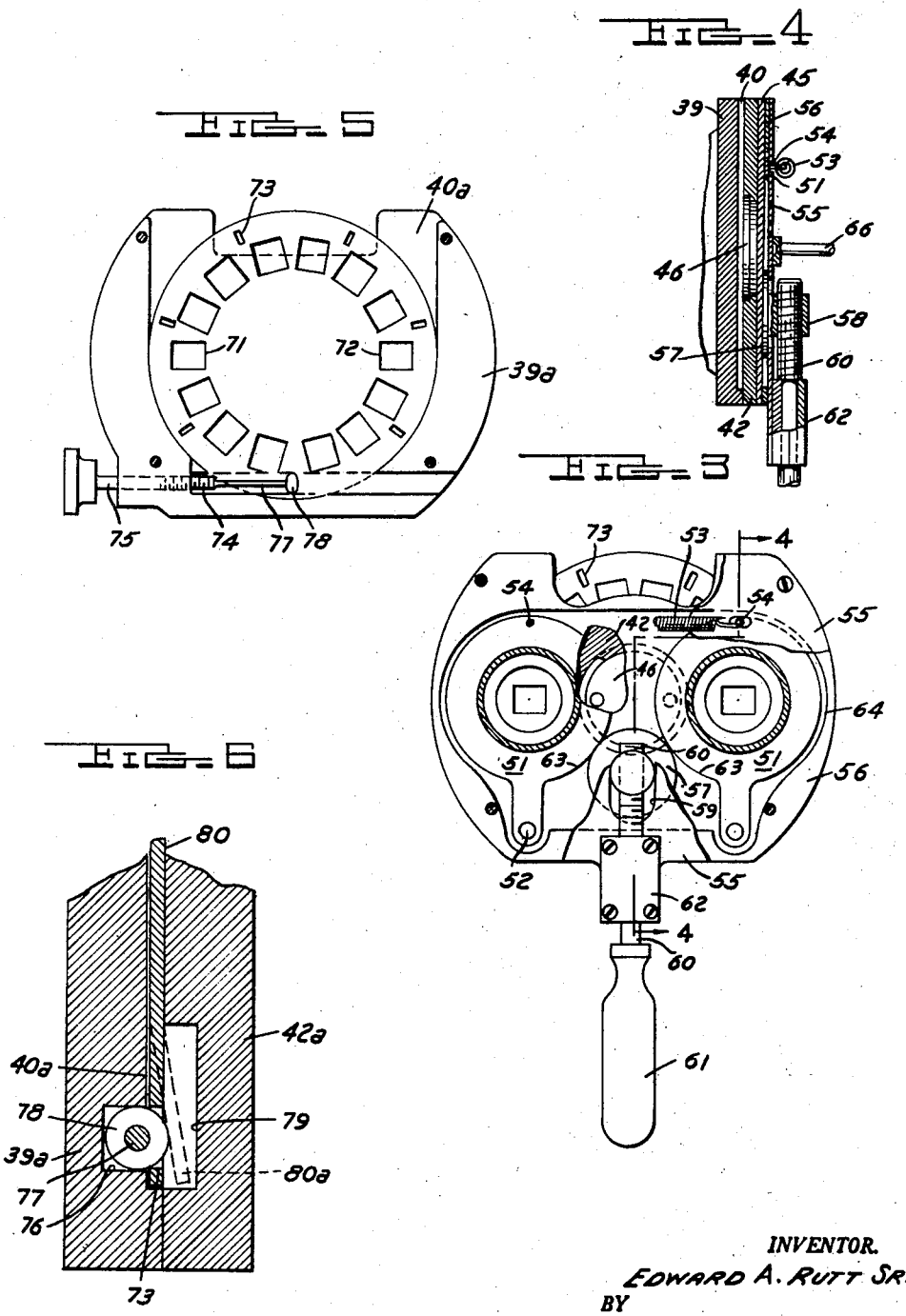

United States Patent Office 2,701,981
Patented Feb. 15, 1955

2,701,981

STEREOSCOPIC PROJECTION DEVICE FOR PROJECTING DUAL IMAGE SLIDES

Edward A. Rutt, Sr., Grosse Pointe Park, Mich.

Application May 25, 1950, Serial No. 164,081

18 Claims. (Cl. 88—27)

The subject matter of this invention is an attachment for use with a standard single lens and condenser system projector for projecting stereoscopic slides. The invention also relates to improvements, applicable to stereoscopic projection devices generally, in means for effecting the principal adjustments necessary in order that the separate images from a dual transparency stereoscopic slide may be properly projected upon the viewing screen While the invention is not concerned with fundamental principles or stereoscopic photography and projection, nevertheless, it is believed that the place of the invention in the art can be better appreciated from a brief discussion of some of the fundamental problems encountered in stereoscopic projection.

In order to obtain a proper projected image, the two separate images of a stereoscopic slide must be placed in superimposed position upon the screen. This requires that the light passing through each separate transparency strike the screen at the same horizontal level and, further, that the light paths converge.

The first of these requirements necessitates relative vertical movement between the two projected light paths, this movement being referred to herein as a horizontal level adjustment, while the second requirement necessitates relative lateral movement between the two projected light paths which will be referred to herein as an interocular adjustment. These adjustments are not a constant factor for a given distance between projector and screen as is the ordinary focusing adjustment. Instead, they vary between slides and as a general rule it may be said that no two slides ordinarily require precisely the same degree of either horizontal or interocular adjustment. This is because the relative positioning between the transparencies may vary from slide to slide due to differences in mounting, and because the relationship between the images carried by each transparency of a pair can vary according to conditions under which the transparencies were taken, such as the camera not being positioned parallel to the horizon, or to conditions built into the construction of the camera. The interocular relationship between the transparencies when projected will also vary somewhat according to the distance of the camera from the subject being photographed.

The object of the present invention is to provide certain constructional features of a stereoscopic projection device for effecting the necessary horizontal and interocular adjustments and preferably to provide a construction wherein both of these adjustments may be made to the desired degree by the manipulation of a single control.

The other principal object of the invention is to embody these adjusting means in the construction of an attachment operating from a single source of light so that stereoscopic slides may be satisfactorily projected using standard forms of single lens projectors.

In the accompanying drawings,

Fig. 1 is a perspective view schematically showing the essential elements of the invention, namely, a slide carrier and a lens mount, to illustrate the relative movements of these parts necessary to effect proper horizontal and interocular adjustment;

Fig. 2 is a plan view, partly in section, of an attachment for single lens projectors incorporating the features of the invention;

Fig. 3 is a front elevation of the device of Fig. 2 taken along the line 3—3 thereof;

Fig. 4 is a sectional elevation taken along the line 4—4 of Fig. 2;

Fig. 5 is an elevation of an alternate form of slide carrier construction which may be used in place of or to supplement the horizontal adjusting means employed in the device of Figs. 2 to 4; and Fig. 6 is an enlarged sectional view showing the engagement between a slide and the device of Fig. 5.

The constructions illustrated in these drawings show the application of the invention in a device for projecting stereoscopic slide of the circular disc type commercially available under the name "View-Master," and while the horizontal adjusting means of Figs. 5 and 6 of the drawings is specifically designed for use with slides of this type, it is to be recognized that the device may be readily modified to accommodate other conventional forms of slides by altering the design of the slide carrier member as will be more fully brought out in the following detailed description of this construction.

Referring first to Fig. 1, two light beams or paths 11 and 12 are shown entering from the upper left of the view, it being understood that this light could emanate from the separate sources of a dual lens projector, or the one source of a single lens projector, split into two paths by suitable means. Polaroid or other filters 13 are interposed in the well-known manner in these light paths 11 and 12 to orientate the light so that each eye of a person, viewing the projected images with the aid of suitable glasses, will see only one of the images. A slide carrier 15, provided with the left and right transparencies 16 and 17, respectively, of a stereoscopic pair, is positioned so that the light paths pass through the transparencies and on through the apertures 18 in a lens mount assembly. In addition to a circular disc 19, the essential elements of this lens mount assembly consist of a pair of keyhole shaped plates 20, each being pivotally connected to the circular disc 19 at a pivot point 21 and each being positioned in one of the light paths 11 and 12. Each of these plates 20 is adapted to mount a lens barrel and lens assembly (not shown in this view) and can be moved laterally relative to the light paths 11 and 12 by the action of an adjusting screw 22, which controls the position of a circular disc 23. As the disc 23 is moved inwardly towards the center of the assembly, it bears against the outer edge 24 of each of the plates 20 moving them about their pivot points 21, this movement being opposed by a spring 9 connected to each plate 20 at a point 10.

A horizontal adjustment may be accomplished either by rotating the slide carrier 15 about a central axial line 25 located substantially midway between the two paths of light 11 and 12, as indicated by the arrow 26. or by a similar rotary movement of the lens mount assembly plate 19 as indicated by the arrow 27. Furthermore, this adjustment may be accomplished by a combination of movements of the slide carrier and lens mount assembly, if necessary or desired. An interocular adjustment, which effects the distance between the two paths of light 11 and 12 when projected, can be accomplished by moving the lens mounting plates 20 and hence the lens barrel and lens assemblies toward or away from each other. This movement is indicated by the arrow 28.

With these essential parts and adjusting movements in mind, the construction of the device illustrated in Figs. 2 to 4 should be easily understood.

Referring first to Fig. 2, an adapter barrel 29 is provided for mounting the attachment to a conventional single lens type of projector. This barrel 29 is carried by a threaded collar 30 in turn attached to the rear face 31 of a mirror box housing 32. Preferably a plate of heat resistant glass 33 is positioned at the rear of the mirror box housing to prevent the parts of the device from being effected by the heat of the light source and also to seal this aperture of the mirror box against dirt. Two central mirrors 34 in conjunction with left and right outer mirror 35 and 36, respectively, are employed to divide the light into two paths. Light from the mirrors 35 and 36 passes through polaroid filters 37 which seal apertures 38 provided in a slide carrier member 39, which member also forms the forward wall of the mirror box.

The slide carrier 39 is formed with a recess 40 similar to the recess 40a formed in the slide carrier member 39a in Fig. 5, this recess 40, in conjunction with the adjacent face 41 of an intermediate plate 42, forming a slot into which a circular type slide can be inserted. Plate 42 is connected to the slide carrier member 40 by screws 44. A lens mounting plate 45 is pivotally secured to the intermediate plate 42 by means of a flanged disc 46, connected to the plate 45 by screws 47 and engaging a recess in the intermediate plate 42. Left and right lens mounts 48 and 49, each comprising a barrel 50 and a flat keyhole shaped mounting flange or plate 51, are positioned on the outer face of the plate 45 with a pivot pin 52, carried by each of the plates 51, engaging a hole in the plate 45. The keyhole shaped plates 51 of the lens mounts are held in position on the outer surface of the plate 45 by an outer cover 55 separated from the plate 45 by a spacer 56, the spacer 56 being slightly greater in thickness than the thickness of the keyhole plates 51 so that the latter will be free to move between the cover plate 55 and plate 45 about their pivots 52. This movement is controlled by a circular disc 57 having a boss 58 which projects outwardly through a slot 59 in the outer cover plate 55, the boss being provided with a threaded hole engaged by an adjusting screw 60. An adjusting handle 61 is attached to the adjusting screw 60 which in turn is mounted in a journal 62 attached to the cover plate 55. Rotation of the adjusting screw 60 in one direction will move the disc 57 upwardly against the outer periphery 63 of each of the keyhole plates, causing each plate to rotate about its pivot 52 towards the side walls 64 of the plate 56, this movement being opposed by the force of a spring 53, interconnecting pins 54 carried by each of the plates 51, and projecting through slots in the cover plate 55. Rotation of the adjusting screw in the opposite direction will cause the disc to move downwardly allowing the spring 53 to rotate the keyhole plates inwardly about their pivots 52. During upward or downward movement of the disc 57, its projecting boss 58 which engages the adjusting screw is free to slide upward or downward in the slot 59 provided in the outer cover plate 55. Lateral movement of the adjusting handle 61 to the right or to the left in Fig. 3 will produce pivotal movement of the entire lens mount assembly with the pivot disc 46 rotating within the recess in the plate 42.

Thus, an interocular adjustment is obtained by rotary movement of the adjusting screw to move the lens mounts inward or outward while a horizontal adjustment is obtained by lateral movement of the adjusting handle to rotate the lens mount assembly about an axis located substantially midway between the left and right paths of light and produce a relative horizontal movement between the parts through which these paths of light are projected.

A lens barrel assembly 65 is carried within the barrel 50 of each lens mount for sliding movement therein controlled by a central focusing screw 66, engaging a focusing nut 67 which carries a cross-member 68 having forked ends 69 each engaging a groove 70 of the lens barrel assembly. This engagement between the member 68 and lens barrels permits lateral movement of the latter for interocular adjustment without affecting the in-and-out focusing adjustment obtained by rotation of the focusing nut 67. In Fig. 2, the lens barrel assemblies are shown adjusted by the nut 67 to their innermost position.

As previously mentioned, the form of horizontal adjusting device shown in Figs. 5 and 6 is particularly useful in positioning circular slides of the "View Master" type and, in fact, when used with these slides, performs a dual function. A standard "View Master" slide as shown in Fig. 5 consists in a series of diametrically opposed stereoscopic pairs, such as the transparencies 71 and 72, mounted in a circular disc of pressed paper construction provided with a series of indexing notches or apertures 73, these rectangular apertures being used in conjunction with a mechanism employed in the standard commercial viewer for indexing purposes.

The slide carrier plate 39a of Figs. 5 and 6 is provided with a threaded hole engaged by the threaded portion 74 of an adjusting screw 75 which projects inwardly into a rectangular recess 76. The inner end of the adjusting screw is formed with a portion 77 of reduced diameter, terminating in an indexing and adjusting knob 78, which is positioned to project into the slide carrying recess 40a and dimensioned to engage one of the apertures 73 of the slide. This engagement is maintained by reason of the natural resiliency of the material of the slide as illustrated in Fig. 6, with the adjacent plate 42a being provided with a recess 79 so that when the slide 80 is manually rotated in the slide carrier to change views, the aperture 73 of the slide will be moved out of engagement with the indexing knob 78 causing the slide to be deflected into the dotted position indicated by the reference 80a. Thus, the lower portion of the slide is forced into the recess 79 by the contact between its surface and the knob 78 and acts as a cantilever spring so that when the next aperture 73 comes into alignment with the position of the indexing knob, the slide 80 will snap back into the full line position shown in Fig. 6. In this position, rotary movement of the adjusting screw 75 to move the indexing knob to the right or left of the position shown will cause a rotation of the slide substantially about its center to produce a relative horizontal displacement between the left and right transparencies 71 and 72.

The horizontal adjustment of the transparencies obtained from the adjusting screw 75 can be employed in lieu of or supplemental to the horizontal adjustment obtained by lateral movement of the adjusting handle 61 previously explained and described. Naturally, if the adjusting screw 75 is used in lieu of lateral movement of the handle 61, the structure can be much simplified since it will not be necessary to incorporate the pivotal mounting of the lens assembly and therefore the lens carrying plate 45 and pivot disc 46 can be eliminated.

This advantage of simplicity of construction must be weighed against the advantage of being able to accomplish both horizontal and interocular adjustment by the manipulation of a single adjusting handle 61.

Another advantage of the construction of Figs. 2 to 4 is the fact that the entire construction used in conjunction with the adjusting handle 61 is applicable to stereoscopic slides of all present types while the horizontal adjustment of Figs. 5 and 6 has application only to the circular type of slide. The modification necessary for the accommodation of other types of slides affects only the slide carrier member 40 with no change being required to the operating parts other than possible changes in dimensioning resulting from the particular spacing between the transparencies employed on slides of one type in comparison with the spacing used in slides of another.

To employ the invention with a dual light source projector, the mirror box and single adapter barrel are discarded and suitable dual adapter barrels used to attach the operating parts described herein to the projector structure.

I claim:

1. In an attachment for use with a single-barrel projector for projecting stereoscopic dual-image slides, means for adjusting the relative horizontal level and distance between two projected beams of light, comprising a supporting member, a lens mounting assembly pivotally secured thereto and including a pair of lens barrels each mounted for movement relative to said assembly whereby the center-to-center distance between said lens barrels may be varied, an adjusting screw for controlling said center-to-center distance upon rotation thereof, said adjusting screw being movable laterally to effect pivotal movement of said lens mounting assembly relative to said supporting member.

2. The invention set forth in claim 1 wherein said lens mounting assembly is further characterized by comprising a back plate and a cover plate spaced therefrom, a plate carrying each of said lens barrels positioned between said back and cover plates and pivotally connected to one of said plates, spring means normally producing relative movement between said lens barrels in one direction, a member positionable by rotation of said adjusting screw to produce such relative movement in the opposite direction.

3. An attachment for use with a single barrel projector for projecting stereoscopic dual-image slides, comprising means to split a source of light into two paths, a member adapted to retain a dual-image slide with each of the transparencies thereof interposed in one of said light paths, a lens assembly including a lens system for each path of light, horizontal level adjusting means for producing relative rotary movement between said slide and said lens assembly about an axis substantially midway between and parallel to said paths of light, interocular adjusting means for varying the center-to-center distance between said lens systems, said horizontal level and said interocular adjusting means each including a common adjusting handle, said horizontal level adjusting means including means for translating lateral movement of said adjusting handle into horizontal level adjusting movement, and said interocular adjusting means including means for translating rotary movement of said adjusting handle into interocular adjusting movement.

4. The invention set forth in claim 3 wherein said horizontal level adjusting means comprises a pivotal connection between said lens assembly and said slide retaining member, said interocular adjusting means comprises a mounting member for each of said lens systems, each of said mounting members being pivotally connected to said lens assembly at a point spaced from the optical axis of its lens system, an adjustable wedge member engaging each of said mounting members and wherein said adjusting handle includes an adjusting screw projecting from said attachment and controlling the position of said adjustable wedge member.

5. The invention set forth in claim 3 wherein said horizontal level adjusting means comprises a pivotal connection between said lens assembly and said slide retaining member, said interocular adjusting means comprises a mounting member for each of said lens systems, an adjustable wedge member engaging each of said mounting members, and wherein said adjusting handle includes an adjusting screw projecting from said attachment and controlling the position of said adjustable wedge member.

6. An attachment for use with a single barrel projector for projecting stereoscopic dual-image slides comprising means to split a source of light into two paths, a member adapted to retain a dual-image slide with each of the transparencies thereof interposed in one of said light paths, a lens assembly including a lens system for each path of light, horizontal level adjusting means for producing relatively rotary movement between said slide and said lens assembly about an axis substantially midway between and parallel to said paths of light, comprising an adjustable indexing member adapted to engage said slide at a point spaced from said axis, and interocular adjusting means for varying the center-to-center distance between said lens systems comprising a mounting member for each of said lens systems, an adjustable wedge member engaging each of said mounting members, and an adjusting screw projecting from said attachment and controlling the position of said adjustable wedge member.

7. A projection device including a slide carrier having means to retain a stereoscopic slide with the transparencies thereof positioned in separate light paths; characterized by means to vary the projected distance between beams of light traversing said light paths comprising a pair of spaced plates secured to said slide carrier, a pair of lens assemblies extending through an aperture in one of said plates, each of said lens assemblies including a mounting flange positioned between said pair of plates, means pivotally connecting said mounting flange to one of said plates at a point spaced from the optical axis of the lens assembly of said mounting flange, a wedge member positioned between said lens assemblies and contacting the mounting flanges thereof, spring means normally urging said mounting flanges into engagement with said wedge member, and means for adjusting the position of said wedge member relative to said mounting flanges, said wedge member being provided with a circular face contacting said mounting flanges.

8. The invention set forth in claim 7 further characterized by said mounting flanges each having an arcuate face contacting the circular face of said wedge member.

9. The invention set forth in claim 7 wherein said wedge member comprises a circular disc having a boss projecting from one circular surface thereof through a slot in one of said pair of plates.

10. The invention set forth in claim 9 further characterized by said adjusting means engaging the projecting boss of said wedge member.

11. A projection device having means to position a slide carrying a pair of stereoscopic transparencies in a pair of light paths, and a lens assembly including a lens system for each path of light; means for adjusting the relative position between said slide and said lens assembly about an axis substantially midway between and parallel to said paths of light, means for adjusting the center-to-center distance between said lens systems, a control handle common to each of said adjusting means, said first-named adjusting means including a pivotal connection between said lens assembly and said slide positioning means, means for translating lineal movement of said handle into relative rotary movement between said slide and said lens assembly about said pivotal connection, and said second-named adjusting means including means for translating rotary movement of said handle into a variation in the center-to-center distance between said lenses, comprising a mounting member for each of said lens systems, each of said mounting members being pivotally connected to said lens assembly at a point spaced from the optical axis of its lens system, an adjustable wedge member engaging each of said mounting members, said handle including an adjusting screw projecting from said lens assembly and controlling the position of said adjustable wedge member.

12. The invention set forth in claim 11 wherein said means for adjusting the center-to-center distance between said lens systems includes a mounting member for each of said lens systems, an adjustable wedge member engaging each of said mounting members, and wherein said handle includes an adjusting screw projecting from said lens assembly and controlling the position of said adjustable wedge member.

13. The invention set forth in claim 12 further characterized by each of said mounting members being pivotally connected to said lens assembly at a point spaced from the optical axis of its lens system.

14. A projection device having a slide carrier adapted to retain a stereoscopic slide with the transparencies thereof positioned in separate light paths, said slide carrier comprising a slot for receiving a circular disc slide of the type carrying pairs of diametrically opposed stereoscopic transparencies and indexing means, said slot having a side wall adapted to engage a portion of the circumferential edge of said disc slide and define a rotational axis therefor, means for producing relative rotary movement between said disc slide and said slide carrier including a member projecting into said slot at a point spaced from said rotational axis and positioned to be engaged by said indexing means of said disc slide, a recess formed in said slot adjacent said member, a portion of said slide being deflected into said recess by said member when said member is not engaged by said indexing means, means controlling the position of said indexing member tangentially of said rotational axis, and means for varying the center-to-center distance between said lens systems, including a mounting member for each of said lens systems, at least one of said mounting members being pivotally connected to said lens assembly at a point spaced from the optical axis of its lens system, means yieldably interconnecting said mounting members, a wedge member engaging each of said mounting members, and means for adjusting the position of said wedge member.

15. In an attachment device for use with a single barrel projector for projecting stereoscopic dual image slides having a slide carrier member adapted to retain a stereoscopic slide with the transparencies thereof positioned in separate light paths, a lens assembly including a lens system for each light path, said slide carrier and said lens assembly being relatively rotatable about an axis substantially midway between and parallel to said paths of light, and each of said lens systems including a lens barrel; means to superimpose projected beams of light traversing said light paths including a supporting member for said lens barrels, at least one of said lens barrels engaging said supporting member at a pivot point spaced laterally from its optical axis of said lens barrel, means for adjusting the position of said lens barrel about said pivot point, and said adjusting means including an adjusting member, the relative rotary position between said slide carrier and said lens assembly being controllable by movement of said adjusting member.

16. In an attachment device for use with a single barrel projector for projecting stereoscopic dual image slides having a slide carrier adapted to retain a stereoscopic slide with the transparencies thereof positioned in separate light paths, said slide carrier comprising a slot for receiving a circular disc slide of the type carrying pairs of diametrically opposed stereoscopic transparencies and indexing means, said slot having a slide wall adapted to engage a portion of the circumferential edge of said disc slide and define a rotational axis therefor, means for producing relative rotary movement between said disc slide and said slide carrier including a member projecting into said slot at a point spaced from said rotational axis and positioned to be engaged by said indexing means of said disc slide, a recess formed in said slot adjacent said member, a portion of said slide being deflected into said recess by said member when said member is not engaged by said indexing means, means controlling the position of said indexing member tangentially of said rotational axis, and means for varying the center-to-center distance between said lens systems.

17. In an attachment device for use with a single barrel projector for projecting stereoscopic dual image slides having means to position a slide carrying a pair of stereoscopic transparencies in a pair of light paths, and a lens assembly including a lens system for each path of light, means for adjusting the relative position between said slide and said lens assembly about an axis substantially midway between and parallel to said paths of light, means for adjusting the center-to-center distance between said lens systems, a control handle common to each of said adjusting means, said first-named adjusting means including a pivotal connection between said lens assembly and said slide positioning means, means for translating lineal movement of said handle into relative rotary movement between said slide and said lens assembly about said pivotal connection, and said second-named adjusting means including means for translating rotary movement of said handle into a variation in the center-to-center distance between said lenses.

18. An attachment device for use with a single barrel projector for projecting stereoscopic dual image slides including a slide carrier having means to retain a stereoscopic slide with the transparencies thereof positioned in separate light paths; characterized by means to vary the projected distance between beams of light traversing said light paths comprising a pair of spaced plates secured to said slide carrier, a pair of lens assemblies extending through an aperture in one of said plates, each of said lens assemblies including a mounting flange positioned between said pair of plates, means pivotally connecting said mounting flange to one of said plates at a point spaced from the optical axis of the lens assembly of said mounting flange, a wedge member positioned between said lens assemblies and contacting the mounting flanges thereof, spring means normally urging said mounting flanges into engagement with said wedge member, and means for adjusting the position of said wedge member relative to said mounting flanges.

References Cited in the file of this patent

UNITED STATES PATENTS

| | | |
|---|---|---|
| 973,961 | Oliver | Oct. 25, 1910 |
| 1,261,800 | Evans | Apr. 9, 1918 |
| 1,313,241 | Ashley | Aug. 19, 1919 |
| 1,407,906 | Wenderhold | Feb. 28, 1922 |
| 1,656,389 | Nothstine | Jan. 17, 1928 |
| 1,861,496 | Guggenheim | June 7, 1932 |
| 1,871,281 | Savage | Aug. 9, 1932 |
| 1,883,943 | Kindelmann et al. | Oct. 25, 1932 |
| 2,029,938 | Newman | Feb. 4, 1936 |
| 2,104,778 | Talley | Jan. 11, 1938 |
| 2,189,285 | Gruber | Feb. 6, 1940 |
| 2,250,297 | Ditty et al. | July 22, 1941 |
| 2,405,706 | Musebeck et al. | Aug. 13, 1946 |
| 2,438,333 | Dickman | Mar. 23, 1948 |
| 2,452,745 | Getter | Nov. 2, 1948 |
| 2,493,463 | Morgan et al. | Jan. 3, 1950 |
| 2,511,334 | Gruber | June 13, 1950 |
| 2,525,598 | Gruber | Oct. 10, 1950 |
| 2,580,874 | Wottring | Jan. 1, 1952 |
| 2,598,573 | Lutes | May 27, 1952 |

FOREIGN PATENTS

| | | |
|---|---|---|
| 7,749 | Great Britain | 1895 |
| 160,512 | Great Britain | Mar. 16, 1921 |
| 344,289 | France | Aug. 31, 1904 |
| 847,038 | France | June 19, 1939 |
| 850,227 | France | Sept. 4, 1939 |